Dec. 30, 1958  N. F. FLESCH  2,866,524
ROTOR BRAKE

Filed June 17, 1954  3 Sheets-Sheet 1

INVENTOR.
Norman F. Flesch
BY
Orrin O. B. Gamer
Atty.

Dec. 30, 1958  N. F. FLESCH  2,866,524
ROTOR BRAKE

Filed June 17, 1954  3 Sheets-Sheet 2

INVENTOR.
Norman F. Flesch
BY
Orrin O. B. Harner  Atty.

Dec. 30, 1958    N. F. FLESCH    2,866,524
ROTOR BRAKE

Filed June 17, 1954    3 Sheets-Sheet 3

INVENTOR.
Norman F. Flesch
BY
Orrin O. B. Lomer Atty.

United States Patent Office 2,866,524
Patented Dec. 30, 1958

2,866,524

ROTOR BRAKE

Norman F. Flesch, Park Forest, Ill., assignor to American Steel Foundries, Chicago, Ill., a corporation of New Jersey Application June 17, 1954, Serial No. 437,535

7 Claims. (Cl. 188—59)

This invention relates to brake rigging and more particularly to rigging for an off wheel brake arrangement for a railway car truck.

The object of this invention is to provide a brake mechanism with a novel link arrangement whereby a rotor brake is mechanically actuated.

A more specific object is to provide a brake arrangement whereby the brake levers are operatively connected by a floating arm and actuating lever so as to apply equal braking pressure to the brake shoes disposed on opposite sides of the rotor.

A more specific object is to provide for a brake arrangement mounted to the truck frame in such a manner as to permit the use of either a single or duplex brake cylinder without changes in the basic frame mounting. Particularly, the invention comprehends brake levers, having shoes on adjacent ends thereof engaging a brake rotor, and having their opposite ends pivotally mounted to the frame, and cooperating linkage operatively interconnecting a power source with the brake levers.

Figure 1:
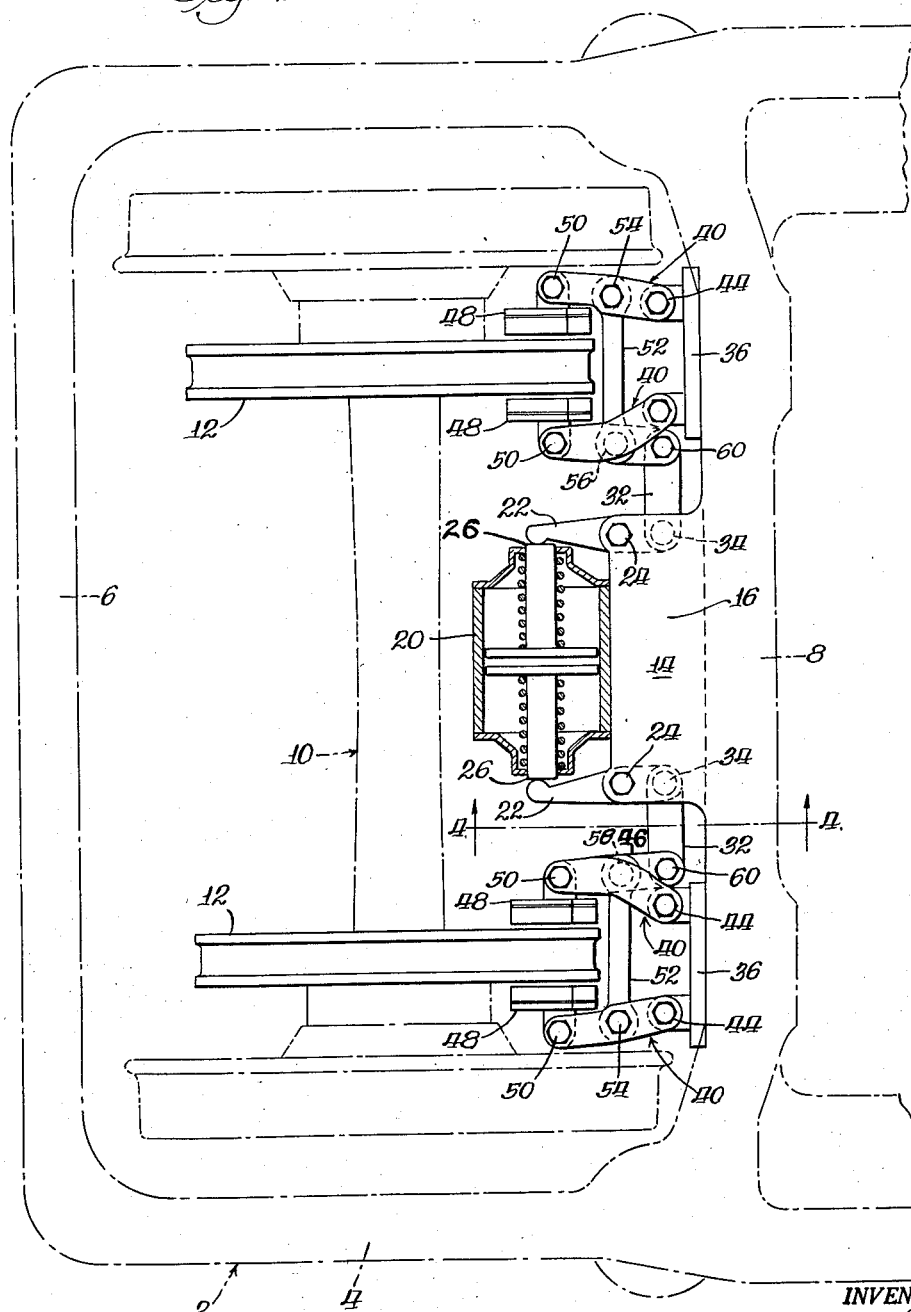
Figure 2:
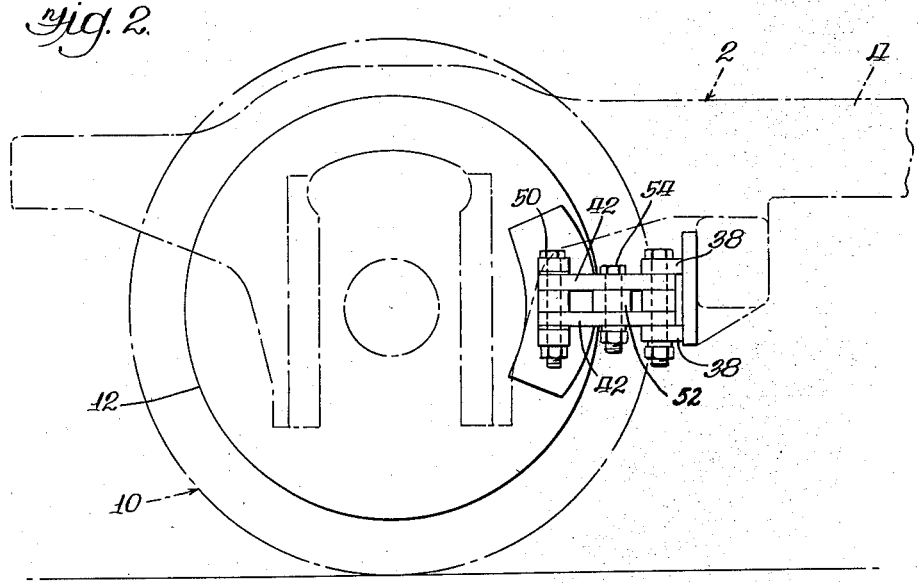
Figure 3:
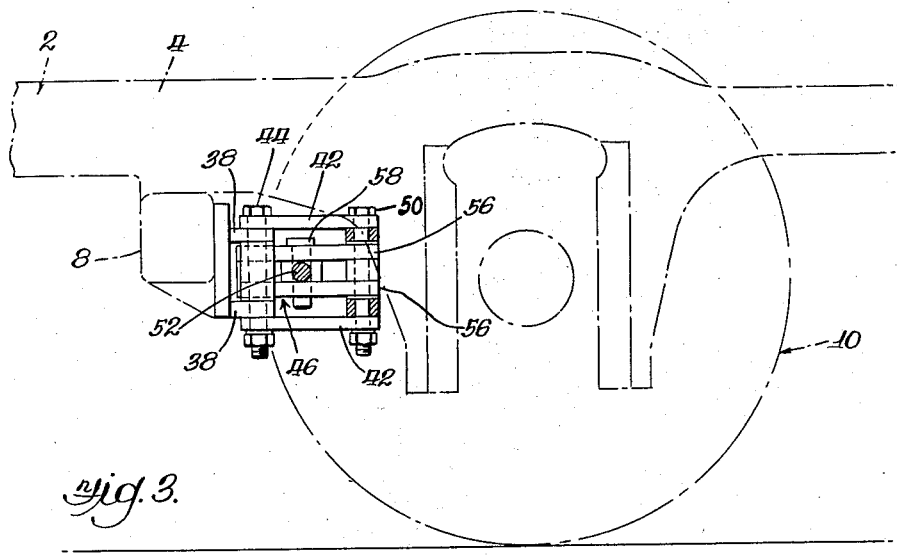
Figure 2A:
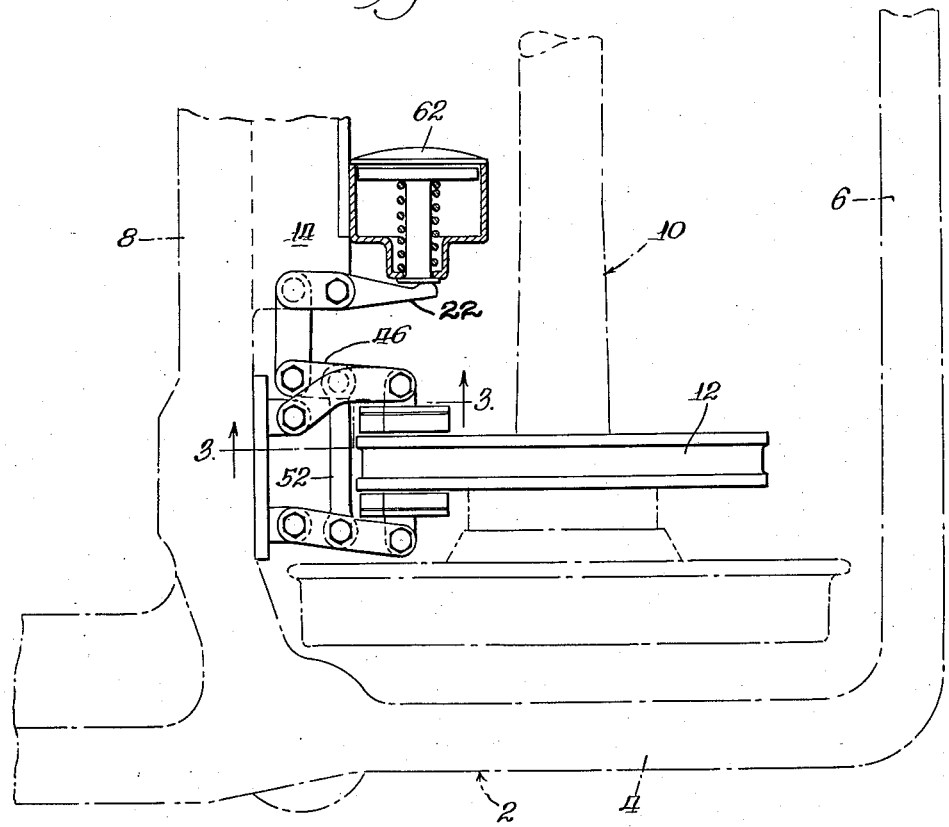
Figure 4:
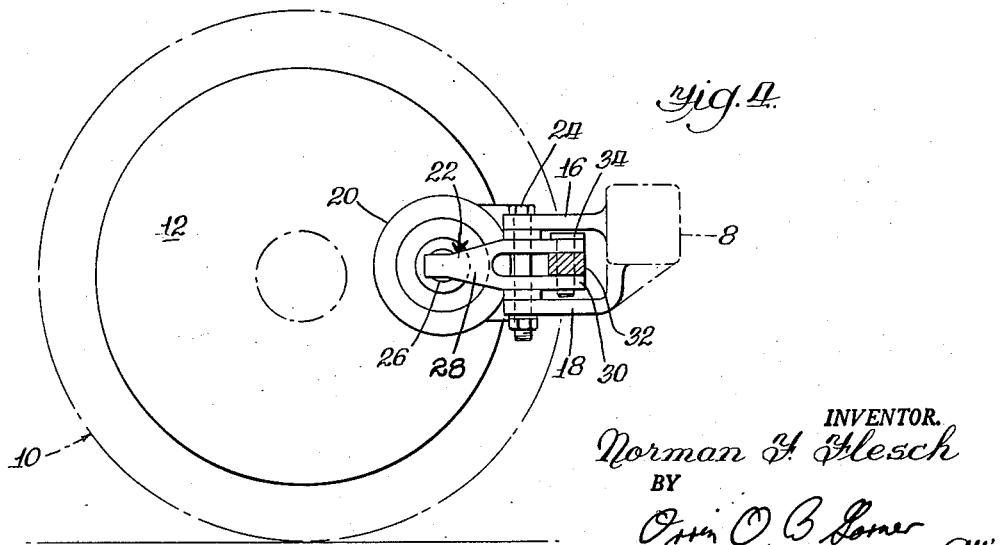

These and other objects of the invention will become apparent from an examination of the following specification and the attached drawings, wherein:

Figure 1 is a fragmentary top plan view of a railway car truck embodying the invention, only one-half of the truck being shown inasmuch as the brake rigging may be duplicated in the other half of the truck, Figure 2 is a side elevational view of the structure shown in Figure 1, Figure 2a is a fragmentary top plan view of one quadrant of a railway car truck embodying a modification of the invention, Figure 3 is a fragmentary sectional view taken along line 3—3 of Figure 2a, and Figure 4 is a fragmentary sectional view of the structure taken along line 4—4 of Figure 1.

Describing the invention in detail, the truck frame designated 2 comprises at each side thereof a side rail 4 and at each end thereof an end rail 6 as well as a transom 8 at each side of the transverse center line of the truck. The truck additionally comprises a plurality of wheel and axle assemblies indicated generally at 10, said assemblies having brake disks or rotors 12 conventionally mounted thereon to rotate therewith. As is well known to those skilled in the art, the wheel and axle assemblies flexibly support the frame in the conventional manner.

Directing attention to Figure 1, it will be seen the transom 8 has mounted on one side centrally thereof a bracket 14, said bracket comprising vertically spaced generally horizontal plates 16 and 18 (Figure 4). A duplex operating cylinder 20 may be mounted on the bracket 14 on the side thereof adjacent the wheel and axle assembly 10. Operating levers 22, 22 are disposed intermediate the plates 16 and 18 on opposite ends of the bracket 14. A fulcrum or pivotal connection is afforded each lever 22 by means of a pin connection 24 between the levers 22 and spaced plates 16 and 18. It should be noted that the cylinder 20 has an actuating piston 26 on each side thereof, each piston serving to engage and move the related operating lever 22. Additionally, it will be noted that the operating linkage is identical on both sides of the truck illustrated in Figure 1, therefore it will be necessary to hereafter describe in detail the linkage on only one side of the truck.

The lever 22 comprises arms 28 and 30 extending from opposite sides of the fulcrum 24, the arm 28 operatively engaging the adjacent cylinder piston 26 and the arm 30 being bifurcated, adjacent its end, to receive one end of a pull link 32. Pivotal connection is made between the link 32 and the arm 30 by means of the pin 34.

Another bracket 36 may be mounted to the transom 8 in such a position as to be longitudinally aligned with the related rotor 12. The bracket 36 comprises two pairs of vertically spaced lugs 38, 38, said pairs being horizontally spaced on the bracket 36. A pair of brake levers 40, 40, each comprising vertically spaced plates or segments 42, 42 having one end thereof pivotally attached to the respective pair of spaced lugs 38 by means of pins or bolts 44.

It will be noted that plates 42 of the inboard brake levers 40 are vertically spaced a greater distance than the corresponding plates of the outboard brake lever 40 to accommodate the interposing of an actuating lever 46 which will be hereafter more fully described.

A pair of brake head-brake shoe assemblies 48, 48 are pivotally mounted on the levers 40, 40 by means of pins 50, 50 at the ends thereof opposite the mentioned ends, said assemblies 48 being arranged on opposite sides of the rotor 12, whereby under the action hereinafter described, the assemblies clasp the rotating disk to decelerate the truck.

A connecting or pull rod 52 has its outboard end received intermediate the plates 42, 42 of the outboard brake lever 40 (Figure 2), a pivotal connection being provided between said brake lever and the rod 52 by means of the pin 54. The actuating lever 46 also comprises spaced plates 56, 56, said plates receiving therebetween the inboard end of a rod 52. Again pivotal connection is provided by means of pin 58. The actuating lever 46 has one end thereof pivotally connected to the inboard shoe assembly 48 and the inboard brake lever 40 at the point of connection between the inboard brake lever and the related shoe assembly, the pin 50 serving to accomplish the multiple connection. The other end of the actuating lever 46 is pivotally connected by means of a pin 60 to the other end of the heretofore mentioned pull link 32.

Referring now to the Figure 2a, the alternate embodiment of the invention, it will be seen that the operating brake mechanism is substantially identical with that of the herefore described embodiment. However, the bracket 14 has mounted thereon a single acting operating cylinder 62 which operatively coacts with the operating lever 22 to actuate the arrangement. It should be noted that the embodiment of Figure 2a may have only one brake rotor and one operating brake mechanism on the axle. If desired, the structure shown in the Figure 2a may be duplicated by providing two rotors each having an operating linkage associated therewith and an independent single acting brake cylinder.

To briefly describe the operation of the several embodiments, it will be seen that the related piston engages the associated operating lever 22 upon actuation of the operating cylinder in the conventional manner. The operating lever 22 is fulcrumed about pin 24, whereby the pull link 32 is moved inboardly of the truck. Movement of the pull link inboardly causes an inboardly pivotal movement of the actuating lever 46 which in turn carries the connecting rod 52 inboardly. The combined movement of lever 46 and rod 52 urges the brake levers 40 and corresponding shoe assemblies 48 toward each other, whereby the shoes engage and clasp the brake disk. The actions above described occur virtually simultaneously and the novel linkage assures the equal distribution of braking pressure to both shoe assemblies. Provision is made for disengagement by means of a spring assembly housed in the power cylinder in the usual manner familiar to those skilled in the art.

I claim:

1. In a railway car truck brake arrangement, a wheel and axle assembly, a frame and bracket means supported thereby, said arrangement comprising friction surfaces presented by the wheel and axle assembly and rotatable therewith, friction shoes engageable with respective surfaces, a power cylinder mounted to said bracket means, the longitudinal axis of the cylinder being substantially parallel to the rotational axis of said assembly, an operating lever member fulcrumed directly to the bracket means and being operatively connected to said cylinder, dead brake lever members pivotally mounted at corresponding ends thereof on the bracket means, opposite corresponding ends of said dead lever members being operatively connected to respective shoes, an actuating lever member pivotally connected to one dead lever member and its associated shoe, a floating pull link member pivotally connected to corresponding ends of said actuating lever member and said operating lever member, and a pull rod member pivotally connected to the other dead lever member and said actuating lever member intermediate their ends, said members being pivotal on substantially parallel axes.

2. In a brake arrangement, a wheel and axle assembly, a frame supported thereby, a brake disk attached to the wheel and axle assembly and rotatable therewith, power means supported by said frame, a dead operating lever fulcrumed to the frame and being operatively connected to the cylinder, brake shoe assemblies disposed on opposite sides of said disk, dead brake levers having corresponding ends fulcrumed to the frame and having other corresponding ends supporting the respective brake shoe assemblies, an actuating lever pivotally connected at one end thereof to one brake shoe assembly and its related dead brake lever at said other end thereof, a pull rod interconnecting medial portions of the actuating lever and the other dead brake lever, and a pull link connecting the other end of said actuating lever to said operating lever, said levers, said link and said pull rod being disposed in parallel horizontal planes.

3. In a brake arrangement, a wheel and axle assembly, a brake rotor secured to and rotatable therewith, power cylinder means, brake means engageable with said rotor, said brake means comprising brake shoes disposed on opposite sides of said rotor, the longitudinal axis of said power cylinder means intersecting said brake shoes, an operating lever operatively mounted to the frame and operatively engaging said power cylinder means, a pull link having an end pivotally connected to said operating lever, a pair of dead brake levers pivotally mounted to the frame at corresponding ends adjacent the rotor and being pivotally connected at their other corresponding ends to the brake shoes, an actuating lever pivotally connected at one end thereof to the other end of the pull link, said actuating lever having its other end pivotally connected to one of said brake shoes and its related brake lever, and a pull rod pivotally interconnecting medial portions of the other brake lever and said actuating lever, said power cylinder means and said brake means being disposed between the rotative planes of the wheels of said assembly.

4. In a mechanical linkage arrangement for connecting a power source to friction shoe means engageable with a wheel and axle assembly, a frame supported by said assembly, an operating lever fulcrumed to the frame and having an end operatively engaging the power source, a pair of dead brake levers having corresponding ends fulcrumed to the frame, said dead levers carrying said friction shoe means at the other corresponding ends thereof, a floating actuating lever having an end pivotally connected to one of said friction shoe means and its related dead brake lever, a pull link pivotally interconnecting the other ends of said operating lever and actuating lever, and a floating pull rod pivotally interconnecting the floating actuating lever and the other brake lever.

5. In a brake arrangement for a railway car truck having a frame and a supporting wheel and axle assembly with a rotatable disk rigidly secured thereto, a power cylinder supported by the frame and having a longitudinal axis extending substantially parallel to the rotational axis of said assembly, friction shoe assemblies engageable with said disk, and brake linkage interconnecting the power cylinder and said friction shoe assemblies, said brake linkage being disposed in substantially horizontal planes, said linkage comprising a pair of dead brake levers fulcrumed at corresponding ends to the frame and having the other corresponding ends operatively connected to the respective friction shoe assemblies, a pair of actuating levers, one of said actuating levers being a dead lever fulcrumed to the frame and being operatively connected to the power cylinder, the other of said actuating levers being a floating lever pivoted to one of the friction shoe assemblies and the associated dead brake lever, a pull link operatively interconnecting corresponding ends of the actuating levers, and means comprising a pull rod pivotally interconnecting the dead actuating lever and the other dead brake lever.

6. An off-wheel brake arrangement for a railway car truck having a frame and a supporting wheel and axle assembly comprising in combination: a disk member secured to said assembly for rotation therewith and having friction surfaces on opposed sides thereof, friction means engageable with said surfaces, a power cylinder operatively supported by the frame adjacent said disk member and having its longitudinal axis disposed substantially normal to and intersecting the planes of said friction means, and linkage operatively interconnecting the power cylinder and friction means, said linkage being disposed entirely in substantially horizontal planes, said linkage comprising a pair of dead brake levers having corresponding ends fulcrumed to the frame and opposite corresponding ends pivotally connected to the respective friction means, a live actuating lever pivoted at one end to one of the friction means and the related dead brake lever, a dead actuating lever fulcrumed to the frame and being operatively connected to the power cylinder, a pull link pivotally interconnecting the dead actuating lever and the other end of the live actuating lever, and a connecting rod pivotally interconnecting the live actuating lever and the other dead brake lever.

7. In a brake arrangement, a wheel and axle assembly, a frame supported thereby, a brake disk secured to the axle of said assembly and rotatable therewith, a power cylinder disposed intermediate the wheels of said assembly and carried by the frame, the longitudinal axis of said power cylinder extending parallel to the longitudinal axis of said axle, a dead operating lever having an end thereof engageable with said power cylinder, said operating lever being fulcrumed intermediate its ends to the frame, a pair of dead brake levers disposed inboardly and outboardly of said disk, said brake levers being pivotally connected at their respective ends to said frame, friction means disposed inboardly and outboardly of said disk and engageable therewith, said means being carried by respective opposite ends of said brake levers, an actuating lever having an end thereof pivotally connected to said inboard brake lever and friction means, a link interconnecting the opposite end of said actuating lever and the other end of said operating lever, and a floating pull rod interconnecting the actuating lever and the outboard dead brake lever intermediate their ends.

References Cited in the file of this patent

UNITED STATES PATENTS

| | | |
|---|---|---|
| 1,434,678 | Chandeson | Nov. 7, 1922 |
| 1,779,776 | Masion | Oct. 28, 1930 |
| 2,064,367 | Baselt | Dec. 15, 1936 |
| 2,174,403 | Farmer | Sept. 26, 1939 |
| 2,274,859 | Eksergian | Mar. 3, 1942 |
| 2,343,342 | Tack | Mar. 7, 1944 |
| 2,359,081 | Blomberg | Sept. 26, 1944 |
| 2,713,400 | Coskun | July 19, 1955 |